United States Patent [19]
Weber et al.

[11] Patent Number: 5,155,942
[45] Date of Patent: Oct. 20, 1992

[54] APPARATUS FOR PRODUCING A PROFILED TEMPLATE

[76] Inventors: Rudolf Weber, Am Sportplatz 3, 8702 Neubrunn-Böttigheim; Klaus Heiermann, c/o Michael Weinig Aktiengesellschaft of Weinigstrasse 2/4, 6972 Tauberbischofsheim, both of Fed. Rep. of Germany

[21] Appl. No.: 428,493

[22] Filed: Oct. 27, 1989

[30] Foreign Application Priority Data

Oct. 28, 1988 [DE] Fed. Rep. of Germany ... 8813579[U]

[51] Int. Cl.$^5$ .............................................. B24B 49/00
[52] U.S. Cl. .............................. 51/165.72; 51/165.74; 51/100 P
[58] Field of Search ............. 51/100 R, 100 P, 165.72, 51/165.74, 165.75, 165.76

[56] References Cited

U.S. PATENT DOCUMENTS 2,397,933 4/1946 Fowle et al. ................... 51/165.72
4,524,521 6/1985 Kolb ................................ 51/165.72

Primary Examiner—M. Rachuba
Attorney, Agent, or Firm—Robert W. Becker & Associates

[57] ABSTRACT

An apparatus for producing a profiled template, comprising a grinding support provided with a holder for the template, a tracing support that is fixedly connected to the grinding support, a projector having a projection screen that is provided with a marking, and a template pattern having a profile contour that is adapted to be projected onto the projection screen for moving along the marking thereof.

20 Claims, 1 Drawing Sheet

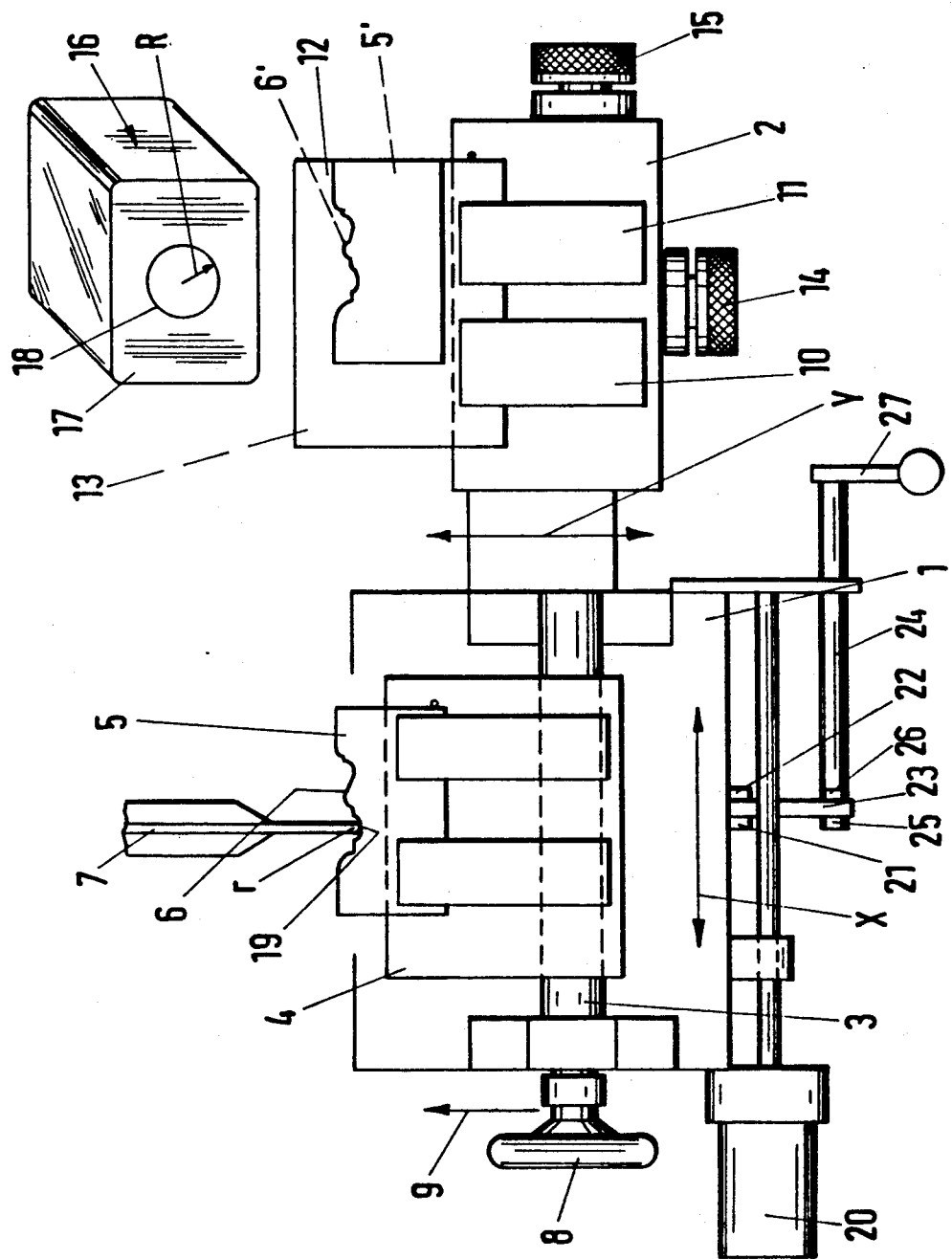

APPARATUS FOR PRODUCING A PROFILED TEMPLATE

BACKGROUND OF THE INVENTION

The present invention relates to an apparatus for producing a profiled template.

For example with woodworking machines, blade heads are used that are equipped with profiled blades and with which pieces of wood can be profiled. These profiled blades are produced in conformity with profiled templates that in turn must be produced in conformity with prefabricate patterns. To produce the template, a blank is used that is placed alongside the template pattern. A grinding wheel then moves along the profile contour of the template pattern to hereby produce a corresponding profile in the blank. The production of a template with such an apparatus requires great care, great skill, and much experience.

It is therefore an object of the present invention to embody an apparatus of the aforementioned type in such a way that with such an apparatus templates can be precisely produced without an operator of the apparatus having to have much experience and skill.

BRIEF DESCRIPTION OF THE DRAWING

This object, and other objects and advantages of the present invention, will appear more clearly from the following specification in conjunction with the accompanying schematic drawing, which shows one exemplary embodiment of the inventive template profiling apparatus.

SUMMARY OF THE INVENTION

The apparatus of the present invention comprises: a grinding support that is provided with holder means for the template; a tracing support that is fixedly connected with the grinding support; a projector that has a projection screen that is provided with a marking; and a template pattern having a profile contour that is adapted to be projected onto the projection screen for movement along the marking thereof.

With the inventive apparatus, the contour of the template pattern is preferably projected onto the screen of the projector in a greatly enlarged scale. The marking found on the projection screen corresponds to the grinding wheel of the grinding support. The tracing support is now set in such a way that the profile contour of the template pattern in the projection screen rests against the marking at the beginning of the profile contour. Since the grinding support is fixedly connected with the tracing support, this setting adjusts the template that is to be produced to the same extent, so that the grinding wheel rests against the beginning of the profile contour that is to be produced. The operator of the inventive apparatus can now very easily shift the unit comprising the grinding support and the tracing support in such a way that the profile contour of the template pattern that is visible in the projection screen is guided along the marking. This movement is transferred onto the grinding support, and hence onto the template that is to be produced, thereby producing the profile contour on the template. Due to the preferably high magnification or enlargement, the displacement movement can be controlled very easily on the projection screen of the projector, so that the template can be precisely produced without difficulty and also without having to exert great forces. Since the profile contour is projected onto the projection screen, it is no longer necessary to have a model as the template pattern. It is sufficient for the template pattern to be a transparent tracing sheet that is provided with the profile contour that is to be produced. This tracing or pattern can then be projected onto the screen of the projector, for example via a transmitted light process.

Further specific features of the present invention will be described in detail subsequently.

DESCRIPTION OF PREFERRED EMBODIMENTS

Referring now to the drawing in detail, the template profiling apparatus is provided with a grinding support 1 that is fixedly connected with a tracing support 2. The grinding support 1 carries a grinding mandrel 3 that is provided with a holder or locating fixture 4 for the profiled template 5 that is to be ground. The profile 6 is ground on the template 5 with the aid of a grinding wheel 7 that is controlled by tracing. The grinding mandrel 3 can be adjusted in the direction of the arrow 9 on the grinding support relative to the grinding wheel 7.

The tracing support 2 carries two holders 10, 11 with which it is possible to hold on the tracing support 2 two plates 12 that are made of transparent material, preferably glass. Disposed between the plates 12 is a transparent tracing sheet 13 on which, in a scale of 1:1, the template pattern 5' that is to be produced is indicated. The two plates 12 project beyond the tracing support 2 in such a way that the pattern or tracing 5' lies beyond the tracing support 2. In order to be able to adjust the holders 10, 11 with the plates 12 in the X and Y directions, two control wheels 14 and 15 are mounted on the tracing support 2.

The tracing or pattern 5' has exactly the profile contour 6' that is to be produced on the profiled template 5.

The template profiling apparatus is furthermore provided with a projector 16 that has a projection screen 17. The screen 17 carries a circular marking 18, the radius R of which corresponds to the radius "r" of the grinding wheel surface 19, multiplied by an enlargement factor "z". In the illustrated embodiment, the radius R is twenty times the radius "r" of the grinding wheel surface 19.

Via the horizontal light process, the profile contour 6' of the pattern 5' is portrayed in the scale z:1, in the illustrated embodiment 20:1, on the projection screen 17 of the projector 16. The unit comprising the grinding support 1 and the tracing support 2 is now moved in the X and Y directions in such a way that the profile contour 6' of the pattern 5' is moved along the circular marking 18 of the projection screen 17. The circular marking 18 symbolizes the grinding wheel 7. During this movement along the circular marking 18, the profiled template 5 is profiled by the grinding wheel 7 in conformity with the traced profile contour 6'. The template profiling apparatus is set in such a way that the distance between the grinding wheel 7 and the center point of the circular marking 18 is equal to the distance between the profiled template 5 and the pattern 5'. Thus, as the profile contour 6' moves along the circular marking 18, the grinding wheel 7 profiles the template 5 to the desired profile contour 6 in a single procedural operation. With the inventive apparatus, the profiled template 5 can be produced pursuant to the pattern 5' in a scale of 1:1. Since the plates 12 and the tracing sheet 13 are transparent, in the described horizontal light process the pattern 5' can be projected onto the screen 17 of the projector 16. In place of the transparent tracing sheet 13, it is also possible, for example, to use a wooden pattern in the scale of 1:1. In this case, the contour of this wooden pattern is projected onto the screen 17 of the projector 16 via a vertical illumination or incident light process. Here also the profile contour 6' can easily move along the circular marking 18.

To adjust the grinding support and the tracing support 2 that is fixedly connected therewith, a preferably regulatable drive motor 20 is provided that is disposed on the grinding support 1. For an adjustment in the Y direction linked to the grinding support 1 between two brackets 21, 22 is one end of a lever 23, the other end of which is linked between two brackets 25, 26 that project at right angles from a shaft 24. Fixedly mounted on that end of the lever that is remote from the brackets 25, 26 is a radially projecting lever 27 with which the shaft 24 can be rotated about its axis. By pivoting the lever 27, the grinding support 1, and hence also the tracing support 2, are moved in the Y direction via the lever 23.

During the profiling process, the unit comprised of the grinding support 1 and the tracing support 2 is moved in the X direction by the drive motor 20. If the motor 20 can be regulated, the possibility exists where less complicated profiles 6 are present, of moving the support unit 1, 2 at a somewhat greater speed in the X direction, whereas for complicated profiles, the speed of the process can be reduced. It is also possible, and particularly advantageous, to set varying speeds within a single profile. For example, regions can exist within a profile 6 that can be removed very rapidly, and regions can also exist that require a slower process speed in the X direction, such as steep edges on the profile 6. Since with the drive motor 20 the support unit 1, 2 is continuously moved by the motor 20 in the X direction, it is merely necessary for the operator of the template profiling apparatus to move the support unit 1, 2 in the Y direction via the lever 27 in such a way that the circular marking 18 always rests exactly against the profile contour 6' of the pattern 5'.

Pursuant to one straightforward specific embodiment of the present invention, it is also possible, instead of having a drive motor 20 that is regulatable, to have a motor that moves the support unit 1, 2 at a constant speed that is as low as possible.

It is also possible, in place of the drive motor 20 to undertake a manual adjustment in the x direction. In this case, the operator has to manually move the support unit 1, 2 not only in the X direction but also in the Y direction.

An important advantage of the inventive template profiling apparatus is that in the projector 16, the radius "r" of the grinding wheel surface 19 is portrayed with the enlargement factor "z". The profile contour 6' of the pattern 5' is also portrayed with a corresponding enlargement factor. If now during movement of the profile contour 6 inaccuracies should occur, these inaccuracies have an only immaterial effect on the profile 6 that is to be produced, because at the profile 6 these inaccuracies ar less than at the projection screen 17 by the enlargement factor "z".

The lever 27 is preferably secured to the shaft 24 via a clamp. As a result, the possibility exists for adjusting the lever 27 relative to the shaft 24 in such a way that it is always at the correct level for the size of the operator. In addition, with such an arrangement the speed ratio in the Y direction can be adjusted. For example, in one setting the lever 27 must be pivoted over a large angular range in order to achieve a specific Y-displacement, whereas with a different setting of the lever 27 on the shaft 24, a lesser pivot movement is required for the same Y-displacement. Consequently, it is possible to have an individual coordination with regard not only to the size of the operator but also with regard to the responsiveness or skill of the operator.

With the templates 5 that are produced, the appropriate profiling blades are produced in the grinding machine.

The inventive template profiling apparatus is preferably a part of the grinding machine. However, it is also possible to use the template profiling apparatus as a auxiliary device.

It is to be understood that the grinding wheel 7 can have greatly varying profiles in conformity with the profile 6 of the template 5 that is to be produced. The marking 18 on the projection screen 17 of the projector 16 has a corresponding configuration.

The present invention is, of course, in no way restricted to the specific disclosure of the specification and drawing, but also encompasses any modifications within the scope of the appended claims.

What I claim is:

1. An apparatus for producing a profiled template, comprising:
    a grinding support provided with holder means for holding said profiled template;
    a stationary grinding wheel coordinated with said grinding support;
    a tracing support that is fixedly connected with said grinding support during production of said profiled template, with said grinding support and said tracing support being jointly adjustable during production of said profiled template in directions that are at an angle to one another;
    a projector that has a projection screen that is provided with a marking; and
    a template pattern with a profile contour being supported on said tracing support, said profiled contour being projectable onto said projection screen, whereby only said profiled contour is visible on said projection screen, said tracing support and said grinding support being displaced relative to said projector and said grinding wheel during production of said profiled template by moving said profiled contour along said marking.

2. An apparatus according to claim 1, in which said template pattern is a tracing on a transparent tracing sheet and exhibits said template that is to be produced.

3. An apparatus according to claim 2, in which said template pattern is a 1:1 scale tracing.

4. An apparatus according to claim 2, in which said tracing sheet is disposed between transparent plates.

5. An apparatus according to claim 4, in which said plates are made of glass.

6. An apparatus according to claim 1, in which said template pattern is a model that corresponds to said template that is to be produced.

7. An apparatus according to claim 6, in which said template pattern is a 1:1 scale model.

8. An apparatus according to claim 6, in which said model is a wooden model.

9. An apparatus according to claim 1, wherein said grinding wheel has a surface for profiling said template, and said marking of said projection screen has a shape that corresponds to the shape of said grinding wheel surface.

10. An apparatus according to claim 9, in which said shape of said marking is larger than said shape of said grinding wheel surface by a given enlargement factor.

11. An apparatus according to claim 1, in which said profile contour of said template pattern projected onto said projection screen is larger than a contour of the template to be produced by a given enlargement factor.

12. An apparatus according to claim 1, which includes a drive motor for moving the unit comprised of said grinding support and said tracing support in an X direction.

13. An apparatus according to claim 12, in which said drive motor is a regulatable drive motor.

14. An apparatus according to claim 13, which includes a manual drive mechanism for shifting the unit comprised of said grinding support and said tracing support in a Y direction.

15. An apparatus according to claim 14, in which said drive motor is provided on said grinding support.

16. An apparatus according to claim 14, in which said manual drive mechanism is disposed on said grinding support.

17. An apparatus according to claim 14, in which said manual drive mechanism includes a shaft that is connected to said grinding support, and a first lever for rotating said shaft.

18. An apparatus according to claim 17, in which said shaft is operatively connected with said grinding support via a second lever that extends at right angles from said shaft.

19. An apparatus according to claim 18, in which said first lever is adjustably disposed on said shaft.

20. An apparatus according to claim 1, in which the distance between said grinding wheel and said marking of said projection screen is equal to the distance between said template and said template pattern.

* * * * *

UNITED STATES PATENT AND TRADEMARK OFFICE
CERTIFICATE OF CORRECTION

PATENT NO.  : 5,155,942

DATED       : October 20, 1992

INVENTOR(S) : Weber et al

It is certified that error appears in the above-identified patent and that said Letters Patent is hereby corrected as shown below:

On the title page: Item

[22]   Filed:  October 27, 1989
       (under 37 CFR 1.47)

Signed and Sealed this

Sixteenth Day of November, 1993

Attest:

BRUCE LEHMAN

Attesting Officer

Commissioner of Patents and Trademarks